United States Patent [19]

Webb

[11] Patent Number: 4,846,850

[45] Date of Patent: Jul. 11, 1989

[54] ABSORPTION PRESSURE CONTROL

[75] Inventor: Don W. Webb, Bartlesville, Okla.

[73] Assignee: Applied Automation, Inc., Bartlesville, Okla.

[21] Appl. No.: 157,763

[22] Filed: Feb. 19, 1988

[51] Int. Cl.[4] .......................... B01D 53/14; B01D 3/42
[52] U.S. Cl. ............................................ 55/21; 55/48;
55/160; 55/218; 55/271; 202/160; 203/2;
203/DIG. 18
[58] Field of Search ...................... 55/18, 21, 48, 160,
55/218, 271, 274; 202/160; 203/1, 2, DIG. 18

[56] References Cited

U.S. PATENT DOCUMENTS

| | | | |
|---|---|---|---|
| 2,695,836 | 11/1954 | Gilmore | 23/3 |
| 2,933,901 | 4/1960 | Davidson | 62/37 |
| 2,976,689 | 3/1961 | Dodds et al. | 55/21 X |
| 3,090,683 | 5/1963 | Berger | 48/196 |
| 3,197,138 | 7/1965 | Lupfer | 235/200 |
| 3,362,132 | 1/1968 | Schellenberg | 55/21 |
| 3,446,709 | 5/1969 | Marshall | 55/160 X |
| 3,619,377 | 11/1971 | Palmer et al. | 203/2 X |
| 3,905,873 | 9/1975 | Wright et al. | 203/2 X |
| 3,967,937 | 7/1976 | Hobbs | 55/18 |
| 4,106,916 | 8/1978 | Tuckett et al. | 55/21 |
| 4,298,363 | 11/1981 | Campbell et al. | 203/2 X |
| 4,368,058 | 1/1983 | Crowley et al. | 55/21 |
| 4,530,738 | 7/1985 | Funk | 203/2 |
| 4,578,151 | 3/1986 | Soderstrom, III et al. | 203/2 X |
| 4,717,396 | 1/1988 | Stengle et al. | 55/21 X |

FOREIGN PATENT DOCUMENTS 709146  1/1980  U.S.S.R. ................... 55/160

Primary Examiner—Robert Spitzer
Attorney, Agent, or Firm—Laney, Dougherty, Hessin & Beavers

[57] ABSTRACT

In an absorption process utilizing a feed gas compressor, the absorption pressure is maximized within the constraints of the system by a computer controller that automatically increases the pressure until a constraint for compressor speed or absorption pressure is encountered. The control action coordinately manipulates compressor speed and the absorption pressure in response to the actual compressor suction pressure to achieve the desired result.

16 Claims, 1 Drawing Sheet

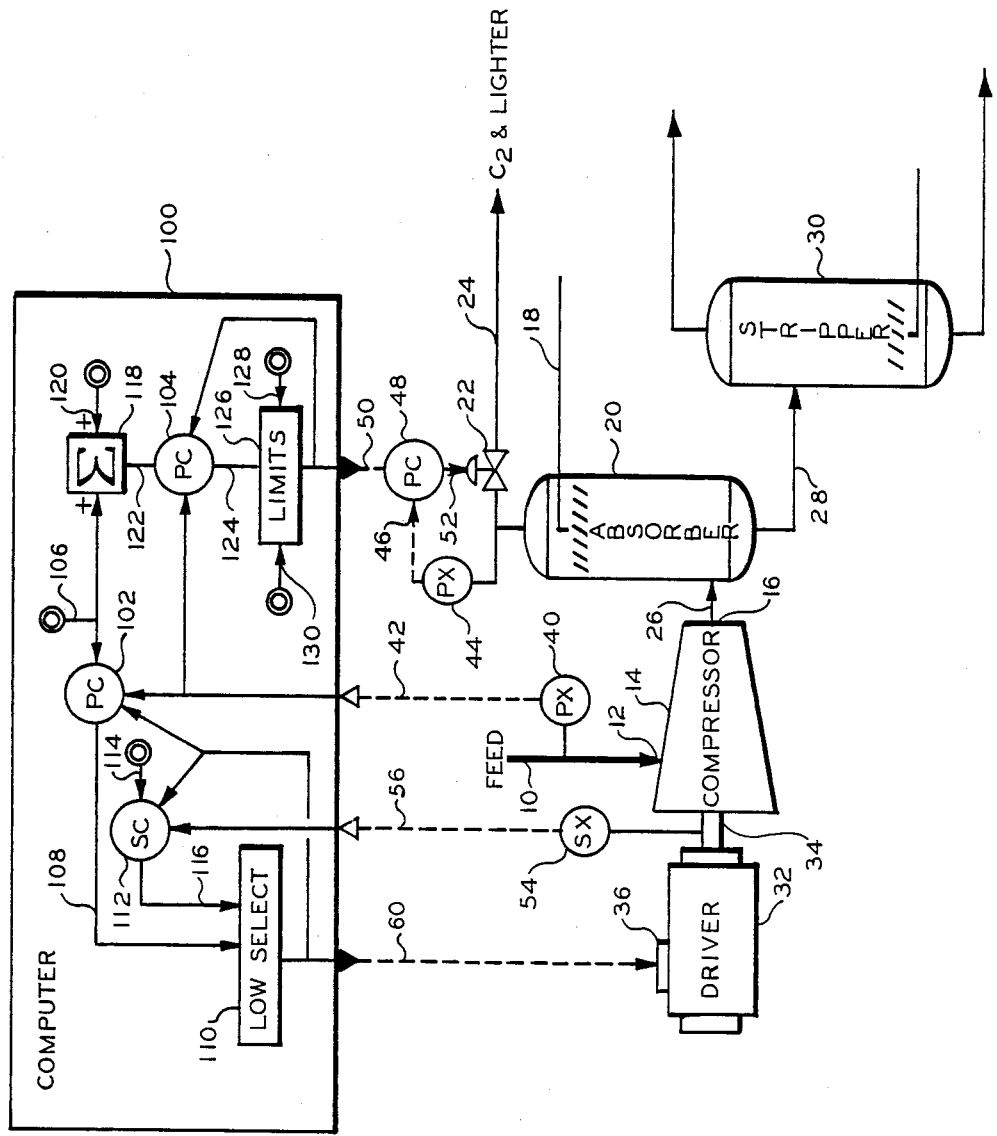

ABSORPTION PRESSURE CONTROL

This invention relates to absorption. In one aspect it relates to apparatus for controlling pressure in an absorption column. More specifically it relates to a method for maximizing the operating pressure in an absorption process.

It is well known that low molecular weight hydrocarbons can advantageously be produced in cracking of heavy hydrocarbons in Fluidic Catalytic Cracking Units (FCCU). An effluent stream from such an FCCU process includes hydrocarbon components having boiling points over a wide temperature range. One proposed process for separating a desired hydrocarbon component from such a mixture of components involves removing the $C_3$ and heavier hydrocarbons in an absorption column. An absorption column utilized to separate a mixture of normally gaseous hydrocarbon components is referred to herein as a fractionating absorption column.

A suitable pressure and a correspondent temperature must be maintained in a fractionating absorption column to insure recovery of a desired component of the hydrocarbon mixture that is subjected to the absorption process. In some cases the fractionating absorption column pressure corresponds to the pressure available in the hydrocarbon feed stream. More generally, however, the desired pressure is supplied by means of a compressor for the hydrocarbon feed stream.

It is desirable to maximize pressure in a fractionating absorption column which removes ethane and lower boiling components in an overhead stream from a normally gaseous feed mixture of hydrocarbon components, thus to maximize the recovery of hydrocarbon components that are higher boiling than ethane.

Accordingly it is an object of this invention to manipulate the absorption column pressure in such a manner that the maximum pressure that can safely be provided by the feed gas compressor is maintained in the fractionating absorption column. It is another object of this invention to automatically increase the operating pressure of an absorption column until a constraint is encountered.

In accordance with the invention method and apparatus are provided for automatically controlled the compressor suction pressure for an absorption column in which the feed to the column is compressed by the gas compressor. A desired compressor suction pressure is maintained by coordinately manipulating both compressor speed and the actual absorption pressure responsive to the actual compressor suction pressure. In this control action the absorption column pressure is automatically increased until a constraint is encountered, and this results in an efficient pressure for operation of the absorption column while maintaining safe operating conditions for the compressor.

This control is accomplished by providing a biased and an unbiased set point signal for the compressor suction pressure. The unbiased set point signal, which is preferably representative of a suction pressure that is lower than the biased suction pressure set point by a predetermined increment, is provided to a pressure controller for the compressor suction pressure. This controller manipulates compressor speed.

The biased set point signal for compressor suction pressure is provided to a cascade control mode loop which responds to the actual absorption pressure in addition to the compressor suction pressure. The biased set point signal manipulates absorption pressure.

Since the biased and unbiased set points for compressor suction pressure cannot be simultaneously satisfied by the actual suction pressure, the control action causes the absorption pressure to increase until a constraint is encountered. For example, if the pressure controller manipulating compressor speed is satisfied, the pressure controller manipulating absorption pressure will increase the absorption pressure, which in turn will cause the compressor suction pressure to decrease. The cycle will repeat until a constraint on compressor speed or absorption pressure is encountered.

Other objects and advantages of the invention will be apparent from the foregoing brief description of the invention and the claims as well as the detailed description of the drawing which is a diagrammatic illustration of an absorption column with the pressure control system of the present invention.

The invention is illustrated and described in terms of a particular process in which a fractionating absorption column is employed to remove $C_2$ and lighter components from a mixture of hydrocarbon components. However, the problem of controlling pressure in a column is broadly applicable to absorption operations in general. Therefore, the invention is applicable to any absorption process where a feed compressor is utilized to provide a maximum absorption column pressure.

A specific control system configuration is set forth in the figure for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signals handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal represents a measured process parameter or measured parameter or desired value which permits designation of a specific measured or desired value by a specific signal value. A signal is therefore one from which the information regarding the measured or desired value can be readily retrieved regardless of the exact mathematical relationship between the signal units and the measured or desired process units.

Referring now to the drawing, a hydrocarbon feed stream to be separated is supplied at approximately atmospheric pressure through conduit means 10 to the suction inlet 12 of compressor 14 and is discharged from the compressor 14 through the discharge outlet 16 to conduit means 26 and then to absorber 20. The hydrocarbon stream passes upward through baffles or trays or packing in absorber 20, countercurrently to a downflowing absorption medium supplied through conduit means 18. A gaseous hydrocarbon stream of unabsorbed gases is removed from absorber 20 through control valve 22 which is operably located in conduit means 24. Absorbed gases dissolved in the absorption medium are removed from absorber 20 through conduit means 28 and are passed to the stripper 30.

Power supplied to the compressor 14 by means of a driver 32 is operably connected to the compressor 14 by means of the drive shaft 34. The driver 32 can be an electric motor, however, more typically it is a steam turbine or gasoline or diesel engine that is easily adaptable to speed control by fuel throttling or steam regulation through a speed governor 36. A control signal to a speed governor 36 maintains compressor speed essentially equal to the desired speed.

A conventional absorption process using a compressor to compress a feed stream has been described to this point. However, it is the manner in which the absorption process is controlled so as to maintain a desired pressure which provides the novel features of this invention. First the process measurements required for control of absorber 20 will be described, thereafter the manner in which the process measurements and the computer inputs supplied by an operator are utilized to generate the control signals will be described.

Pressure transducer 40 in combination with a pressure measuring device operably located in conduit means 10 provides an output signal 42 which is representative of the actual pressure at the suction inlet 12 of compressor 14. Signal 42 is provided from pressure transducer 40 as an input to computer 100. Likewise pressure transducer 44 in combination with a pressure measuring device operably located in conduit means 24 provides an output signal 46 which is representative of the actual pressure in absorber 20. Signal 46 is provided from pressure transducer 44 as a process measurement input to pressure controller 48. Pressure controller 48 is also provided with a set point signal 50 which is a control signal provided from computer 100 as will be described more fully hereinafter. In response to the difference between signals 46 and 50 pressure controller 48 provides an output signal 52 which is scaled so as to be representative of the position of control valve 22 required to maintain the actual pressure in absorber 20 as represented by signal 46 substantially equal to the desired pressure represented by signal 50.

Speed transducer 54 in combination with a speed sensing device associated with drive shaft 34 provides an output signal 56 which is representative of the actual speed of compressor 14. Signal 56 is provided as an input to computer 100.

In response to input signals 42 and 56 computer 100 provides two control signals 50 and 60. As previously noted control signal 50 is provided as a set point signal to pressure controller 48. Signal 60 is provided as a set point signal governor 36.

Before beginning a description of the computer logic utilized to generate control signals 50 and 60 it is noted that it is desirable to maintain the maximum pressure possible in absorber 20 without violating a constraint for either the process or the compressor. Thus, if the suction pressure becomes too high the absorber pressure is automatically decreased.

Referring now to computer 100, signal 42, which is representative of the actual pressure at the suction inlet 12 of compressor 14, is provided as a process variable input to pressure controllers 102 and 104. Signal 106, which is an operator entered signal representative of the desired suction pressure for compressor 14, is provided as a set point signal to pressure controller 102. In response to signals 42 and 106 pressure controller 102 provides an output signal 108 which is scaled to be representative of the speed of compressor 14 required to maintain the actual suction pressure of compressor 14 substantially equal to the desired suction pressure represented by signal 106. Signal 108 is provided as a first input to low select 110.

Signal 56 which is representative of the actual speed of compressor 14 is provided as the process variable input to speed controller 112. Signal 114 which is an operator entered signal representative of the maximum desired speed for compressor 14 is provided as a set point signal to speed controller 112. In response to signals 56 and 114, speed controller 112 provides an output signal 116 which is scaled so as to be representative of the speed of compressor 14 required to maintain the actual speed represented by signal 56 substantially equal to the maximum speed represented by signal 114. Signal 116 is provided as a second input to low select 110. Since the output of controllers 102 and 112 may or may not be selected to manipulate compressor speed, the unselected controller will be in an open loop condition. Therefore, an external feedback signal 60 which is the signal selected by select 110 is provided to an external input for controllers 102 and 112 to prevent reset windup of controller 102 or controller 112. As previously stated signal 60 is provided as a set point signal from computer 100 to speed governor 36. The governor 36 controls the speed of driver 32 to correspond to the desired suction pressure or the maximum allowable speed for the compressor, depending on whether signal 108 or signal 116 has a lesser value.

Signal 106 is also provided as a first input to summation block 118. Summation block 118 is provided with a second input which is an operator entered signal 120 representative of a desired pressure increment to bias signal 106. Signal 106 is summed with signal 120 in summation block 118 to provide signal 122 which is representative of a desired biased value for the suction pressure of compressor 14. Signal 122 is provided from summation block 118 as a set point signal for pressure controller 104. In response to the difference between signals 42 and 122 pressure controller 104 provides an output signal 124. Signal 124 is scaled so as to be representative of the pressure required in absorber 20 to maintain the actual suction pressure of compressor 14 represented by signal 42 substantially equal to the desired suction pressure represented by signal 122. Signal 124 is provided from pressure controller 104 as an input to limit block 126. Limiting action in computer limit block 126 restricts the output signal 50 from computer block 126 to values between high and low limits as represented by operator entered signals 128 and 130 respectively. Signal 50 is provided from limit block 126 as a set point signal to pressure controller 48, and the pressure in absorber 20 is manipulated in response to control signal 50.

In summary the control system of the present invention generates set point signals for the pressure of an absorption column and the speed of a compressor which compresses a feed stream for the column. The control action is such that the absorption pressure is continually increased until a constraint is encountered, thus resulting in maximizing the operating pressure of the absorption column within the constraints of the absorption process and the feed gas compressor.

The invention has been described in terms of a preferred embodiment as illustrated in the sole Figure. Specific components, exclusive of the computer 100, used in the practice of the invention such as pressure transducers 40 and 44, speed transducer 54, pressure controller 48 and control valve 22 are each well known commercially available components such as are described at length in Perrys Chemical Engineers Handbook, 5th Edition, Chapter 22, McGraw-Hill.

For reasons of brevity conventional auxiliary equipment required for the absorption process such as pumps, additional separators, heat exchangers, and additional measurement and control components, etc. have not been included in the above description since they play no part in the explanation of the invention. While the invention has been described in terms of the presently preferred embodiment, reasonable variations and modifications that are possible by those skilled in the control systems art are within the scope of the described invention and the appended claims.

That which is claimed is:

1. A method for controlling the pressure in an absorption column wherein a feed gas compressor having a suction inlet and a discharge outlet provide a compressed gas feed to said absorption column, said method comprising the steps of:

establishing a first signal representative of the actual pressure at said suction inlet of said feed gas compressor;

establishing a second signal representative of a desired suction pressure for said feed gas compressor;

establishing a third signal representative of a desired bias for said second signal;

establishing a fourth signal responsive to said second signal and said third signal, wherein said fourth signal is representative of a desired biased suction pressure for said feed gas compressor;

establishing a fifth signal representative of a maximum pressure for said absorption column;

establishing a sixth signal representative of a maximum desired speed for said feed gas compressor;

manipulating the pressure in said absorption column responsive to said first signal and said fourth signal, wherein the pressure in said absorption column is increased to said maximum pressure represented by said fifth signal if the speed of said feed gas compressor is less than the maximum speed represented by said sixth signal; and manipulating the speed of said feed gas compressor responsive to said first signal and said second signal, wherein the speed of said feed gas compressor is increased to the maximum speed represented by said sixth signal if the pressure in said absorption column is less than the maximum pressure represented by said fifth signal.

2. A method in accordance with claim 1 wherein the step for manipulating the pressure in said absorption column responsive to said first signal and said fourth signal comprises:

comparing said first signal and said fourth signal to establish a seventh signal which is responsive to the difference between said first signal and said fourth signal, wherein said seventh signal is scaled so as to be representative of the pressure in said absorption column required to maintain the actual pressure at the section inlet of said feed gas compressors represented by said first signal substantially equal to the desired biased suction pressure represented by said fourth signal; and means for manipulating the pressure in said absorption column responsive to said seventh signal.

3. A method in accordance with claim 2 wherein said means for manipulating the speed of said feed gas compressor comprises:

comparing said first signal and said second signal to establish on eighth signal which is responsive to the difference between said first signal and said second signal, wherein said eighth signal is scaled so as to be representative of the speed of said feed gas compressor required to maintain the pressure at the suction inlet of said feed gas compressor represented by said first signal substantially equal to the desired suction pressure for said feed gas compressor represented by said second signal; and means for manipulating the speed of said feed gas compressor responsive to said eighth signal.

4. A method in accordance with claim 3 additionally comprising the step of:

establishing a limiting value for said eighth signal, wherein said limiting value for said eighth signal is responsive to said sixth signal.

5. A method in accordance with claim 3 wherein a driving means having a speed control means is provided for said feed gas compressor and said means for manipulating the speed of said feed gas compressor additionally comprises the steps of:

establishing a ninth signal which is representative of the actual speed of said feed gas compressor;

comparing said sixth signal and said ninth signal to establish a tenth signal which is responsive to the difference between said sixth signal and said ninth signal, wherein said tenth signal is scaled so as to be representative of the speed of said feed gas compressor required to maintain the actual speed of said feed gas compressor represented by said ninth signal substantially equal to said sixth signal; and selecting the lower one of said tenth signal and said eighth signal to establish a selected signal, wherein the speed of said feed gas compressor is manipulated in response to said selected signal.

6. A method in accordance with claim 2 additionally comprising the step of:

establishing a limiting value for said seventh signal wherein said limiting value for said seventh signal is responsive to said fifth signal.

7. A method in accordance with claim 2 wherein an overhead stream removes unabsorbed gases from said absorption column and wherein a control valve is operably located in said overhead stream and further wherein the step for manipulating the pressure in said absorption column responsive to said seventh signal additionally comprises the steps of:

establishing an eighth signal representative of the actual pressure in said absorption column;

comparing said seventh signal and said eighth signal to establish a ninth signal which is responsive to the difference between said seventh signal and said eighth signal, wherein said ninth signal is scaled so as to be representative of the position of said control valve required to maintain the actual pressure in said absorption column substantially equal to the desired pressure represented by said seventh signal; and manipulating said control valve in response to said ninth signal.

8. Apparatus comprising:

an absorption column;

compressor means having a suction inlet and a discharge outlet for accepting a feed gas at said suction inlet and providing a compressed gas feed at said discharge outlet;

means for passing said compressed gas feed from said discharge outlet of said compressor means as a feed stream to said absorption column;

means for establishing a first signal representative of the actual pressure at said suction inlet of said compressor means;

means for establishing a second signal representative of a desired suction pressure for said compressor means;

means for establishing a third signal representative of a desired bias for said second signal;

means for establishing a fourth signal responsive to said second signal and said third signal, wherein said fourth signal is representative of a desired biased suction pressure for said compressor means;

means for establishing a fifth signal representative of a maximum pressure for said absorption column;

means for establishing a sixth signal representative of a maximum speed for said compressor means;

means for manipulating the pressure in said absorption column responsive to said first signal and said fourth signal, wherein the pressure in said absorption column can be increased to said maximum pressure represented by said fifth signal if the speed of said compressor means is less than the maximum speed represented by said sixth signal; and means for manipulating the speed of said compressor means responsive to said first signal and said second signal, wherein the speed of said compressor means can be increased to said maximum speed represented by said sixth signal if the pressure in said absorption column is less than the maximum pressure represented by said fifth signal.

9. Apparatus in accordance with claim 8 wherein said means for manipulating the pressure in said absorption column responsive to said first and said fourth signals comprises:

means for comparing said first signal and said fourth signal to establish a seventh signal which is responsive to the difference between said first signal and said fourth signal, wherein said seventh signal is scaled so as to be representative of the pressure in said absorption column required to maintain the actual pressure at said suction inlet of said compressor means represented by said first signal substantially equal to the desired biased suction pressure represented by said fourth signal; and means for manipulating the pressure in said absorption column responsive to said seventh signal.

10. Apparatus in accordance with claim 9 wherein said means for manipulating the speed of said compressor means comprises:

means for comparing said first signal and said second signal to establish an eighth signal which is responsive to the difference between said first signal and said second signal, wherein said eighth signal is scaled so as to be representative of the speed of said compressor means required to maintain the pressure at said suction inlet of said compressor means represented by said first signal substantially equal to the desired suction pressure for said compressor means represented by said second signal; and means for manipulating the speed of said compressor means responsive to said eighth signal.

11. Apparatus in accordance with claim 10 additionally comprising:

means responsive to said sixth signal for establishing a limiting value for said eighth signal.

12. Apparatus in accordance with claim 10 wherein said means for manipulating the speed of said compressor means additionally comprises:

means for driving said compressor means, said driving means having a speed control means;

means for establishing a ninth signal which is representative of the actual speed of said compressor means:

means for comparing said sixth signal and said ninth signal to establish a tenth signal which is responsive to the difference between said sixth signal and said ninth signal, wherein said tenth signal is scaled so as to be representative of the speed of said compressor means required to maintain the actual speed of said compressor means represented by said ninth signal substantially equal to said sixth signal; and means for selecting the lower one of said tenth signal and said eighth signal to establish a selected signal, wherein the speed of said compressor means is manipulated in response to said selected signal.

13. Apparatus in accordance with claim 12 wherein said means for selecting is a low select means.

14. Apparatus in accordance with claim 9 additionally comprising:

means responsive to said fifth signal for establishing a limiting value for said seventh signal.

15. Apparatus in accordance with claim 9 wherein said means for manipulating the pressure in said absorption column responsive to said seventh signal additionally comprises:

means for removing unabsorbed gases from said absorption column in an overhead stream;

a control valve operably located in said overhead stream;

means for establishing an eighth signal representative of the actual pressure in said absorption column;

means for comparing said seventh signal and said eighth signal to establish a ninth signal which is responsive to the difference between said seventh signal and said eighth signal, wherein said ninth signal is scaled so as to be representative of the position of said control valve required to maintain the actual pressure in said absorption column substantially equal to the desired pressure represented by said seventh signal; and means for manipulating said control valve in response to said ninth signal.

16. Apparatus in accordance with claim 8 wherein said absorption column is a fractioning absorption column.

* * * * *